June 5, 1956  J. E. MURREN  2,748,987
LIVE STOCK FEEDING APPARATUS
Filed March 19, 1952
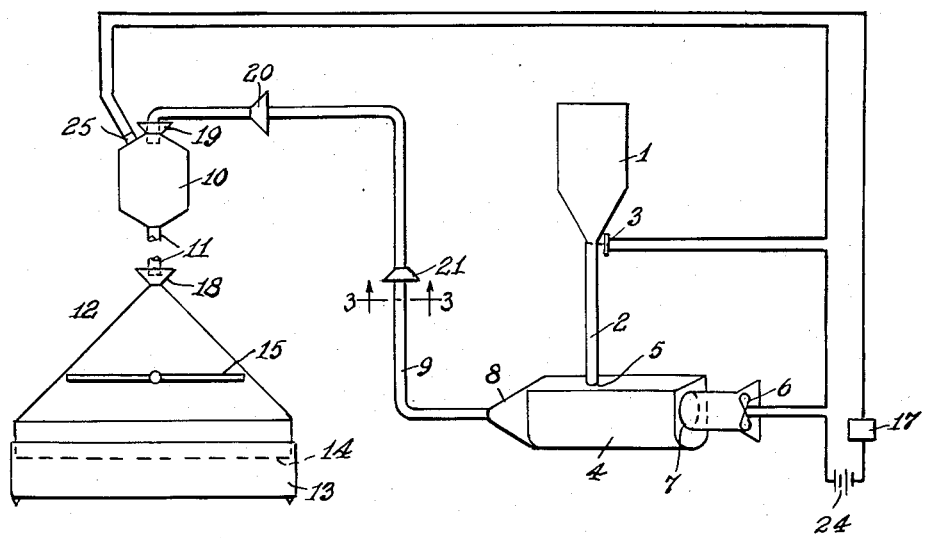
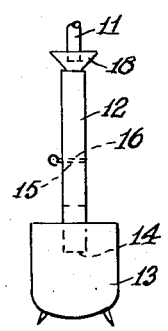
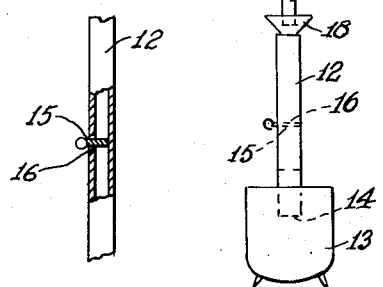
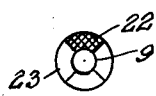
INVENTOR.
JOHN E. MURREN
BY
ATTORNEY.

United States Patent Office 2,748,987
Patented June 5, 1956

2,748,987

LIVE STOCK FEEDING APPARATUS

John E. Murren, Neptune, N. J.

Application March 19, 1952, Serial No. 277,516

1 Claim. (Cl. 222—189)

The present invention deals with live stock feeding apparatus and more particularly with a mash feeding apparatus for poultry.

Controlled feeding of live stock and especially poultry is advantageous where the quality of the poultry is a prime consideration, and where a high egg output and substantially uniform egg weight and yolk color are desirable.

It is known that poultry, e. g. chickens, are somewhat individualistic in feeding habits and that the individual preference of each bird has a bearing on the egg sizes and color of the yolk.

Therefore, various poultry feeding mechanisms have been provided to feed the stock a certain quantity of a particular feed at certain time intervals in order to assure a diet balanced to bring out the desirable quality of poultry and the desirable egg production therefrom.

Such mechanisms generally comprise complex mechanical moving components and are also of a nature which necessitates substantial maintenance in order to insure operation at predetermined schedules.

It is an object of the present invention to provide a live stock feeding apparatus for substantially fluid feed and which operates with a minimum of mechanical moving parts. It is another object of the present invention to provide a mash feeder for poultry which provides an adequate amount of mash at selective intervals or maintains an adequate amount of mash available for feeding. It is a further object of the present invention to provide a mash feeder for poultry which conveys the mash to a plurality of selective locations. Other objects and advantages of the invention will become apparent from the description hereinafter following and the drawings forming a part hereof, in which:

Fig. 1 illustrates a plan view of the invention,

Fig. 2 illustrates a side view of a part of the system of the present invention, Fig. 3 illustrates a check vent member along lines 3—3 of Fig. 1 and Fig. 4 illustrates a fragmentary partly cross-sectional view of Fig. 2 showing an embodiment of the invention.

The present invention deals with an apparatus for maintaining a supply of mash available in a feed trough or a plurality of feed troughs and whereby the mash is conveyed to the troughs through conduits over a substantial distance with a minimum of mechanical moving parts.

Figs. 1 and 2 illustrate the apparatus of my invention which comprises a main mash hopper or container 1 into which the grain is first introduced and which constitutes the mash supply for the apparatus. The hopper 1 is preferably elevated and leading downwardly therefrom is the conduit 2 having incorporated therewith a valve member 3, e. g. a solenoid operated valve member, said conduit leading to a blower chamber 4 through the aperture 5. A mash impelling means, e. g. a blower or fan 6, is associated with one end of the blower chamber 4, e. g. the blower 6 is operatively connected to an end of the blower chamber through the aperture 7 or is otherwise contained by said chamber. A funnel member 8 is connected to the other or opposite end of the chamber and leading therefrom is the conduit 9, which leads preferably to a rafter or other elevated support above the floor of a poultry house and to a secondary elevated container or hopper 10. The secondary hopper 10 is employed primarily under the conditions where a reserve supply of mash is desired so that the use of the blower member 6 may be employed only for extended intervals. Leading downwardly from the hopper 10 is an inlet conduit 11 connected to the top portion of a feeder 12, which is narrower at its top portion and wider at its lower portion and its lower portion being insertable into the feed trough 13, e. g. the feeder may be a conduit of a substantially triangular shape having a base portion or outlet portion 14 of a length sufficient to correspond with the length of the feed trough and preferably of a length such that the outlet portion 14 is insertable into the trough 13, with its ends engageable with the ends of the feed trough.

The feeder 13 is provided with a removable retaining plate 15 between its upper and lower portions. The retaining plate is insertable into the feeder 12 through an opening 16 and is dimensioned to close the feeder to the passage of mash beyond the said plate.

In order to move mash or other substantially fluid feed from the main hopper 1 to the feed trough 13, or to a plurality of feed troughs through a plurality of conduit means, feeders, etc., which are similar to the single conveying apparatus illustrated leading the single feed trough, I provide an electrical circuit and a source of electrical current 24. The electrical circuit comprises a switch member 17 having serially connected therewith and with said source of current the solenoid valve 3 and the blower 6, whereby by means of said switch the solenoid valve is opened for the passage of mash into the conduit 2 and into the blower chamber 4. Simultaneously with the activation of said valve, the blower 6 is activated and blows the mash falling into the blower chamber into the conduit 9, through secondary hopper 10 and into the feeder 12 through the vent structure 18, which is normally in open position, and to the retaining plate 15, which is in close position or locked position during the blowing operation. The upper portion of the secondary hopper 10 is provided with a similar vent 19 and the conduits, e. g. conduit 9, may be provided with a plurality of such vents 20 and 21.

It is known that fluid solid particles can be conveyed from one location to another by means of a medium of a gas or air moving at substantial velocity. For example, this principle is employed in vacuum cleaners wherein a fan or the like draws dust from one point and expels it into a bag at a location beyond the fan, said bag being pervious to the passage of air and impervious to the passage of fine particles and retains the said solid fine particles. Patent No. 2,628,785 illustrates one use of such a system. The vent 18 herein described permits the passage of air through the system and is located so that the solid particles are deposited by gravity into plate 15.

The vents are outlet members employed to provide a conduit system open to the passage of air at selective intervals since in a conduit system completely closed to the passage of air the impelling force of the air cannot be directed to move the mash. Also, in the event of clogging of the conduits, the selectively positioned vents indicate the portion of the system which is clogged should moisture or other foreign matter impede the flow of mash and clog the system.

Fig. 3 illustrates one of the vents, e. g. vent 21, which comprises a substantially funnel-shaped member having a screen 22 impervious to the passage of solid particles therethrough and covering the wide opening thereof and a moveable cover 23 operable to close or lock the vent to the passage of air therethrough.

Upon initial passage of mash through the system only the vent 18 is in the open position whereby the mash is moved through the entire conduit system to the top of the feeder 12 from which position the mash falls into the feeder and against the retaining plate 15 in close position. As the mash fills the feeder 12, the vent 19 above the secondary hopper 10 is opened whereby the mash is moved into the said hopper. When the mash fills the secondary container or hopper 10, or only the feeder 12 if so desired, the switch 17 is opened and the solenoid valve 3 and blower 6 are simultaneously deactivated.

For automatically deactivating the blower 6 and valve 3, I may provide the switch 17 as a time switch to open after a predetermined period, or I may provide switch means 25 either in the hopper 10 or feeder 12 and in series connection with the blower 6 and valve 3 and operative to open the energizing circuit when the feed substantially fills the hopper 10, or feeder 12, if so desired.

When either the feeder 12 or feeder 12 and hopper 10 are filled and blower deactivated, I need only unlock or remove the retaining plate 15 to allow the feed to fall into the trough 13 and thereafter close or insert the retaining plate 15. When the volume of feed below the retaining plate is consumed, I may again reopen the feeder, etc., until it again becomes necessary to refill the feeder or hopper 10 by reactivating the electrical circuit.

The feeding apparatus of the present invention may be set to feed any sized flock of chickens for from three to seven days when the containers and conduits are filled with mash. For example, a timer mechanism such as a time clock may be connected into the circuit and set to operate the feeder at prescribed time intervals and to stop the feeder apparatus at prescribed time intervals.

My invention is not limited to the particular specific embodiments illustrated since some modifications are possible within the true scope of the invention dealing with apparatus to convey substantially fluid feed by means of the blowing system and generic operable structures associated therewith.

What I claim is:

In a pneumatic conveying system for livestock, a feeder member comprising a conduit having an inlet passage and an outlet passage, said outlet passage being larger than said inlet passage, air outlet means connected to and communicating with said inlet passage, said air outlet means being pervious to the passage of air and impervious to the passage of solid particles, a slot through the wall of said feeder member between said inlet and outlet passages, and a movable plate cooperative with said slot for opening and closing said feeder conduit.

References Cited in the file of this patent

UNITED STATES PATENTS

| | | |
|---|---|---|
| 1,028,022 | Hedfeldt | May 28, 1912 |
| 1,033,865 | Bernert | July 30, 1912 |
| 1,412,031 | Vallentyne | Apr. 4, 1922 |
| 1,465,269 | Horn et al. | Aug. 21, 1923 |
| 1,627,926 | Payzant | May 10, 1927 |
| 1,814,673 | Duuck | July 14, 1931 |
| 2,358,000 | Cornell | Sept. 12, 1944 |
| 2,522,449 | Inman | Sept. 12, 1950 |
| 2,563,321 | Dugan | Aug. 7, 1951 |
| 2,572,862 | Israel | Oct. 30, 1951 |

FOREIGN PATENTS

| | | |
|---|---|---|
| 525,080 | France | May 27, 1921 |
| 402,198 | Germany | Sept. 15, 1924 |